(12) United States Patent
Chatterjee et al.

(10) Patent No.: US 12,200,732 B2
(45) Date of Patent: Jan. 14, 2025

(54) UL TRANSMISSION MULTIPLEXING AND PRIORITIZATION

(71) Applicant: Intel Corporation, Santa Clara, CA (US)

(72) Inventors: Debdeep Chatterjee, San Jose, CA (US); Fatemeh Hamidi-Sepehr, San Jose, CA (US); Toufiqul Islam, Santa Clara, CA (US); Sergey Panteleev, Maynooth (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/374,423

(22) Filed: Sep. 28, 2023

(65) Prior Publication Data

US 2024/0023117 A1    Jan. 18, 2024

Related U.S. Application Data

(63) Continuation of application No. 17/174,069, filed on Feb. 11, 2021, now Pat. No. 11,849,461.
(Continued)

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1819* (2013.01); *H04L 5/0053* (2013.01); *H04W 8/24* (2013.01); *H04W 72/569* (2023.01)

(58) Field of Classification Search
CPC ..... H04W 72/23; H04W 8/24; H04W 72/569; H04W 72/1268; H04W 72/21;
(Continued)

(56) References Cited

U.S. PATENT DOCUMENTS

| 2015/0215944 A1* | 7/2015 | Kim | ........................ H04L 5/001 |
| | | | 370/329 |
| 2020/0022161 A1* | 1/2020 | Yang | ........................ H04L 1/16 |

(Continued)

OTHER PUBLICATIONS

U.S. Appl. No. 17/174,069, filed Feb. 11, 2021, UL Transmission Multiplexing and Prioritization.
(Continued)

*Primary Examiner* — Kiet Tang
(74) *Attorney, Agent, or Firm* — Schwegman Lundberg Woessner, P.A.

(57) ABSTRACT

Systems for providing prioritization of UL transmissions in a UE are described. The prioritization information is used to resolve resource conflicts among UL transmissions that include conflicts between high priority UL transmissions, between an aperiodic-channel state information transmission and a scheduling request, and between a low priority UL transmission and a high priority UL transmission when timeline conditions for multiplexing in a single UL transmission are not met. The prioritization is based on timing and priority of the UL transmissions to determine which of the UL transmissions to transmit and which to cancel. Additional prioritization is based on reception by the UE of a cancelation index or in an additional overlapping high priority UL grant received in a DCI of a PDCCH that overlaps with at least one other PDCCH associated with the UL transmissions.

16 Claims, 8 Drawing Sheets

Related U.S. Application Data

(60) Provisional application No. 62/977,048, filed on Feb. 14, 2020, provisional application No. 63/009,347, filed on Apr. 13, 2020, provisional application No. 63/032,414, filed on May 29, 2020.

(51) Int. Cl.
*H04L 5/00* (2006.01)
*H04W 8/24* (2009.01)
*H04W 72/566* (2023.01)

(58) Field of Classification Search
CPC ... H04L 1/1819; H04L 5/0053; H04L 1/1854; H04L 1/1671; H04L 1/1858; H04L 1/16; H04L 5/001; H04L 27/26025; H04L 5/0046
See application file for complete search history.

(56) References Cited

U.S. PATENT DOCUMENTS

| | | |
|---|---|---|
| 2020/0053728 A1* | 2/2020 | Huang .............. H04L 27/26025 |
| 2020/0267749 A1 | 8/2020 | Al-imari et al. |
| 2021/0168848 A1 | 6/2021 | Chatterjee et al. |
| 2021/0227531 A1 | 7/2021 | Song et al. |
| 2021/0329674 A1* | 10/2021 | Matsumura .......... H04L 5/0046 |
| 2022/0174669 A1 | 6/2022 | Yang |
| 2022/0394707 A1 | 12/2022 | Chen et al. |

OTHER PUBLICATIONS

"U.S. Appl. No. 17/174,069, 312 Amendment filed Aug. 8, 2023", 10 pgs.
"U.S. Appl. No. 17/174,069, Corrected Notice of Allowability mailed Aug. 29, 2023", 2 pgs.
"U.S. Appl. No. 17/174,069, Non Final Office Action mailed Apr. 13, 2023", 10 pgs.
"U.S. Appl. No. 17/174,069, Notice of Allowance mailed Jul. 28, 2023", 9 pgs.
"U.S. Appl. No. 17/174,069, PTO Response to Rule 312 Communication mailed Aug. 29, 2023", 1 page.
"U.S. Appl. No. 17/174,069, Response filed Jul. 5, 2023 to Non Final Office Action mailed Apr. 13, 2023", 12 pgs.
"ETSI TS 138 214 V15.3.0", 5G; NR;Physical layer procedures for data (3GPP TS 38.214 version 15.3.0 Release 15), (Oct. 2018), 99 pgs.

* cited by examiner

UL TRANSMISSION MULTIPLEXING AND PRIORITIZATION

PRIORITY CLAIM

This application is a continuation of U.S. patent application Ser. No. 17/174,069, filed Feb. 11, 2021, which claims the benefit of priority under 35 U.S.C. 119(e) to United States Provisional Patent Application Ser. No. 62/977,048, filed, Feb. 14, 2020, United States Provisional Patent Application Ser. No. 63/009,347, filed, Apr. 13, 2020, and United States Provisional Patent Application Ser. No. 63/032,414, filed, May 29, 2020, each of which is incorporated herein by reference in its entirety.

TECHNICAL FIELD

Embodiments pertain to wireless communications in 5G, or new radio (NR) systems.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)/5$^{th}$ generation (5G)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
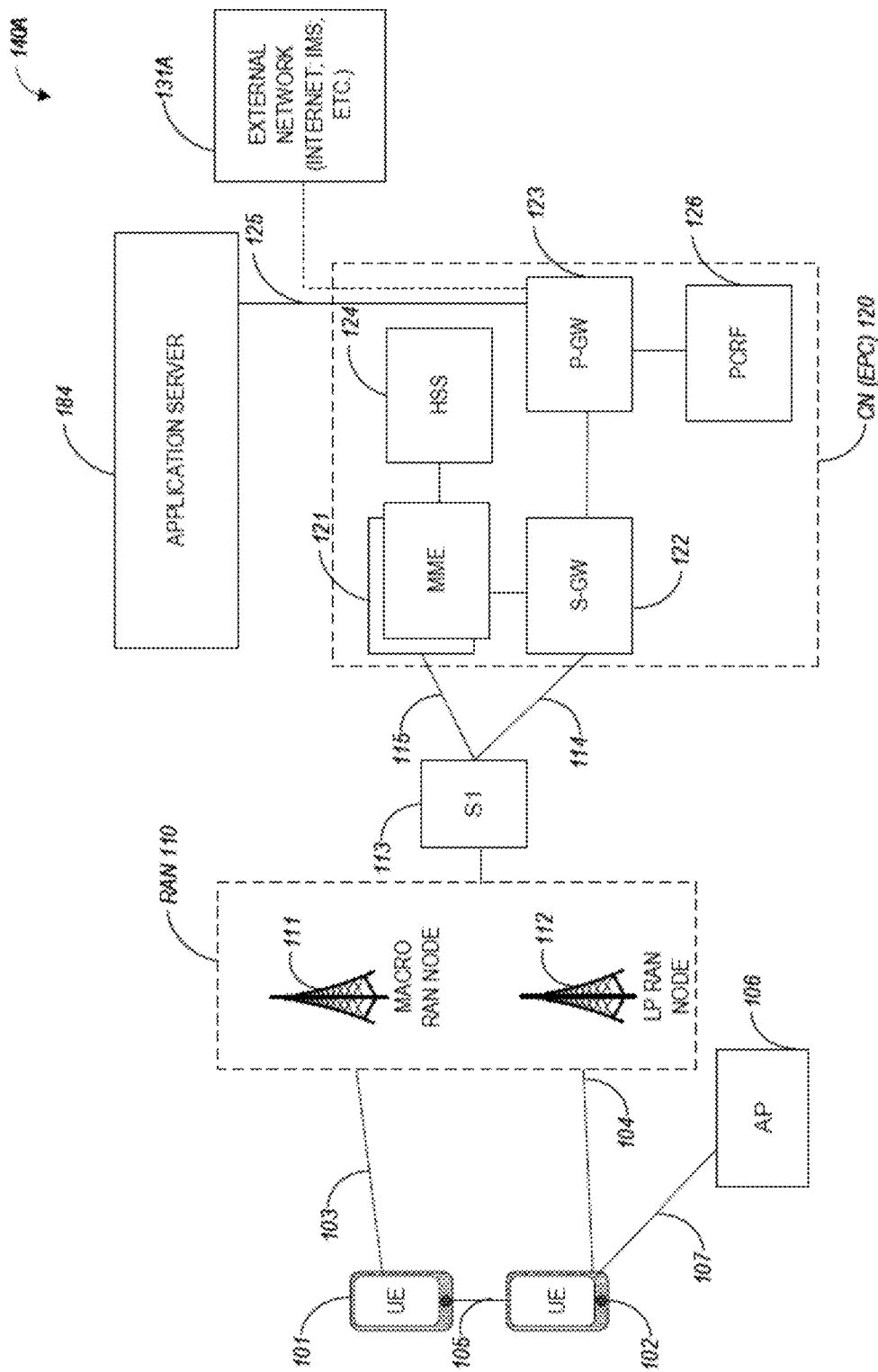
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS)

Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
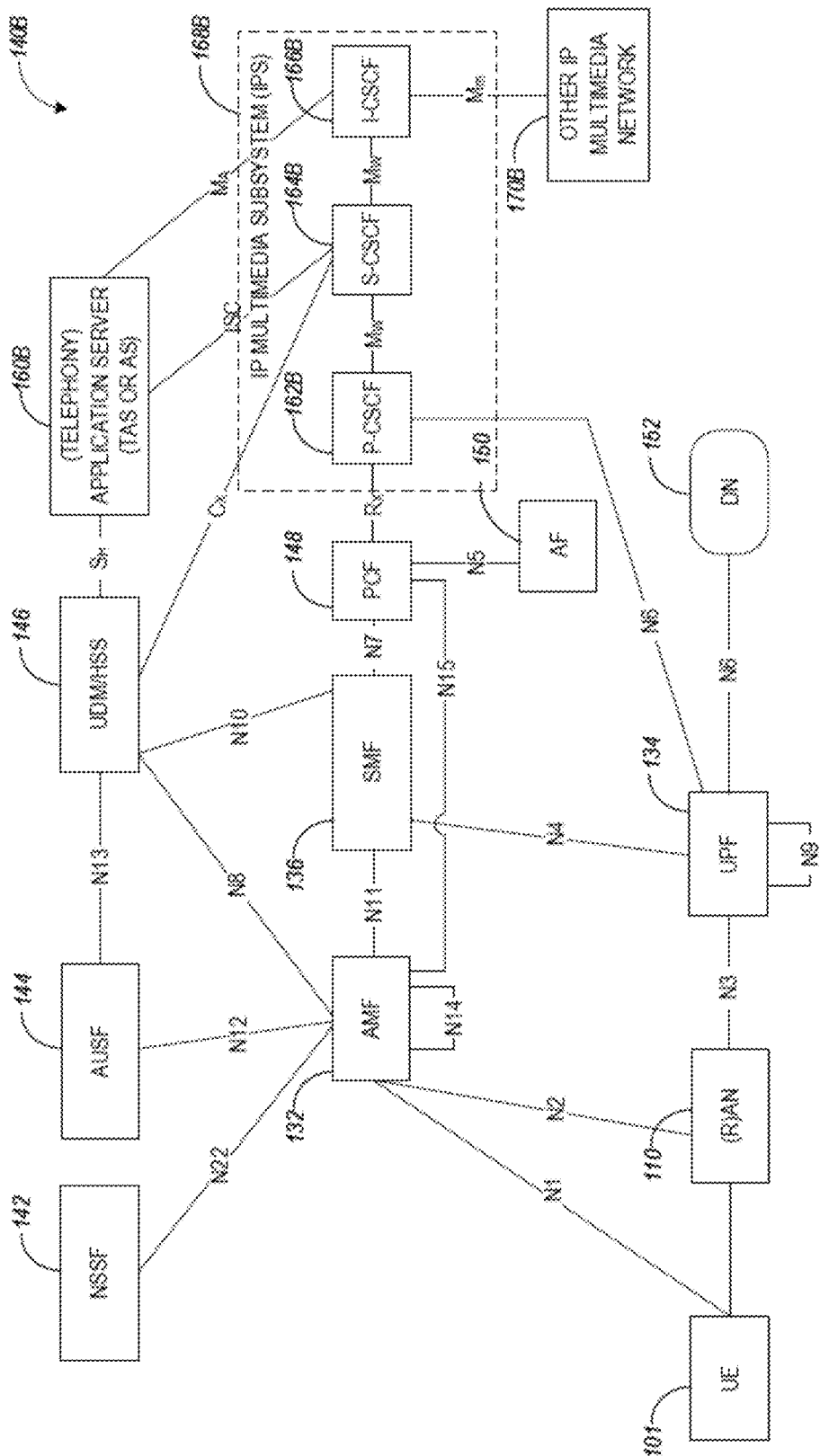
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
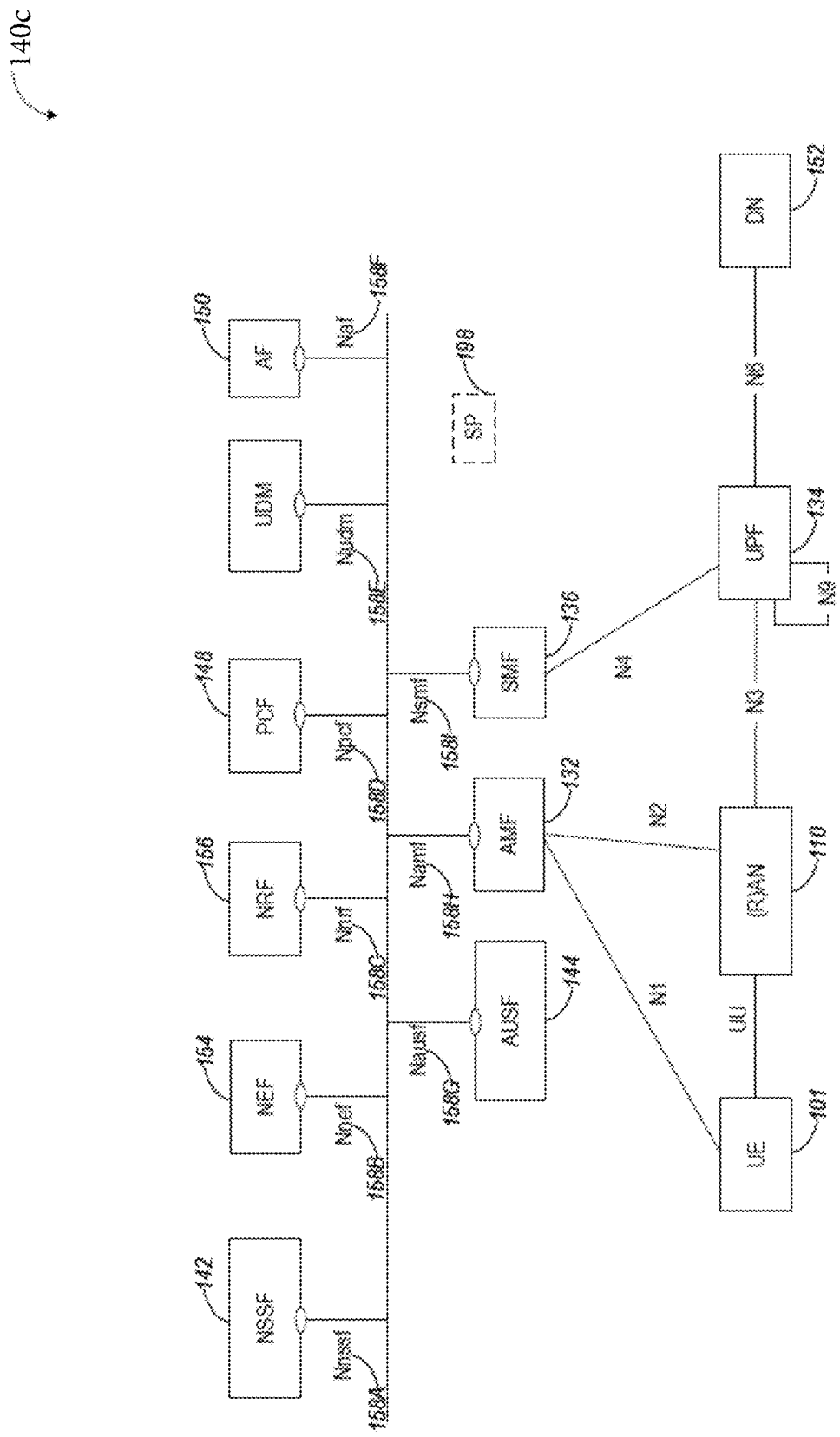
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NS SF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
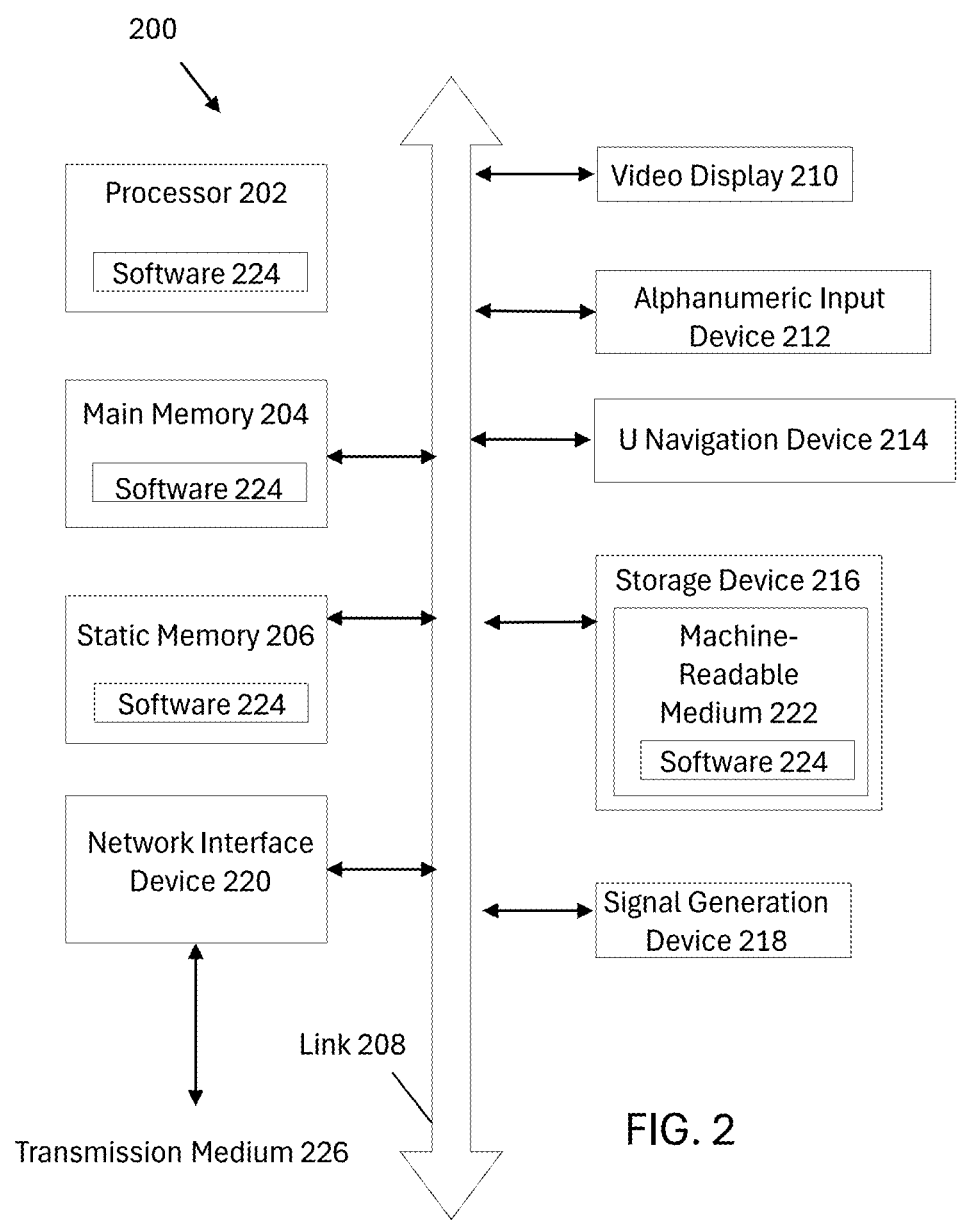
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Mobile communication has evolved significantly from early voice systems to the current highly sophisticated integrated communication platform. The 5G (or new radio (NR)) wireless communication system is intended to provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR evolution may be based on 3GPP LTE-Advanced (LTE-A) with additional potential new Radio Access Technologies (RATs) to provide better, simple and seamless wireless connectivity solutions. NR may enable everything connected by wireless and deliver fast, rich contents and services.

Enhanced mobile broadband (eMBB) and ultra-reliable and low latency communications (URLCC) are service types for NR systems that have different requirements in terms of user plane latency and required coverage levels. For URLLC U-plane latency and reliability, the target for user plane latency should be 0.5 ms for UL and 0.5 ms for DL; the target for reliability should be $1\times10^{-5}$ within 1 ms.

In NR, uplink control information (UCI) can be carried by physical uplink control channel (PUCCH) or physical uplink shared channel (PUSCH). In particular, UCI may include a scheduling request (SR), hybrid automatic repeat request-acknowledgement (HARQ-ACK) feedback, a channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1—reference signal received power)). The CSI report can be periodic, semi-persistent, or aperiodic. An aperiodic CSI (A-CSI) report is triggered by a UL scheduling DCI and carried in a PUSCH. Alternatively, an aperiodic CSI report can be triggered by a DL scheduling DCI and can be carried by a PUCCH. The PUSCH carries a UL data transmission which can be scheduled by the DCI or without scheduling a DCI (e.g., configured grant). Other UL transmissions also include a Sounding Reference Signal (SRS) transmission for UL channel sounding, which can be periodic, semi-persistent, or aperiodic. An aperiodic SRS can be triggered by a UL or DL scheduling DCI or group-common DCI.

Mechanisms on prioritization of different services for control and data transmission are presented. In particular, mechanisms for handling resource conflict of multiple high priority UL transmissions; mechanisms for handling a resource conflict of an A-CSI transmission and SR; and UE behavior on canceling a low priority transmission when there is overlap with a high priority UL transmission are presented.

Method 1

A UE may have time-domain overlaps between transmissions of a PUSCH and a PUCCH carrying a HARQ-ACK such that the UE may not have sufficient processing time available to multiplex the HARQ-ACK onto the PUSCH. That is, the minimum processing time used by the UE before transmission of the PUSCH so that the UE can multiplex the HARQ-ACK and prepare the multiplexed PUSCH.

In one embodiment, the UE may not expect a PUSCH and a HARQ-ACK transmission in a PUCCH overlapping with each other when timeline conditions are not met, especially when both are indicated to be of high priority, e.g., priority index 1.

In another embodiment, when two or more UL channels overlap in time domain and when the timeline conditions for multiplexing in a single UL transmission are not met, the UE prioritizes the transmission of the UL channel that was scheduled by a physical downlink control channel (PDCCH) that ends later in time and drops the other one or more UL transmissions. This provides network more flexibility and permits realization of the potential of the intra-UE prioritization feature in scheduling traffic with tight QoS constraints. For example, if a PUSCH is scheduled by a DCI format and a PDCCH corresponding to the PUSCH ends before the PDCCH corresponding to the HARQ-ACK, and both PUSCH and HARQ-ACK are of high priority, the UE may prioritize the HARQ-ACK and drop the PUSCH (or vice versa).

In another example, a UE does not expect a PUCCH or a PUSCH that is in response to a DCI format detection to overlap with any other PUCCH or PUSCH that does not satisfy the above timing conditions, except when the PUCCH contains HARQ-ACK information and the PUSCH is scheduled by DCI format 0_1 or 0_2, where both the HARQ-ACK information and the PUSCH is of priority index 1. If a PUCCH containing HARQ-ACK information and a PUSCH that are in response to DCI format detection overlap, and if the timing conditions above are not satisfied, and both HARQ-ACK information and PUSCH are of priority index 1, where PDCCHs scheduling the PUCCH and PUSCH end in symbols i and j, respectively, a UE:

transmits the PUCCH containing HARQ-ACK information if symbol i is after symbol j and does not transmit the PUSCH; and transmits the PUSCH if symbol i is before symbol j and does not transmit the PUCCH carrying the HARQ-ACK information.

Further, in an example, the UE does not expect to be scheduled with two or more UL transmissions that overlap partially or fully in time domain, such that the multiplexing time-line conditions are not satisfied, if the scheduling PDCCHs for the two or more UL transmissions end in the same OFDM symbol.

Method 2

If an SR transmission with low priority overlaps with a PUSCH without an uplink shared channel (UL-SCH), where the PUSCH is of high priority and scheduled by a DCI format 0_1 or 0_2 with a non-zero "CSI request", the UE would transmit the PUSCH without a UL-SCH and does not transmit the SR. Here, the PUSCH carries an A-CSI report.

In one embodiment, if a UE would transmit on a serving cell a PUSCH without a UL-SCH that overlaps with a PUCCH transmission on a serving cell that includes positive SR information, the UE does not transmit the PUSCH, except when the PUSCH is of larger priority index and scheduled by a DCI format 0_1 or 0_2 with non-zero "CSI request". If a PUSCH scheduled by a DCI format 0_1 or 0_2 with the "UL-SCH indicator" set to "0", a non-zero "CSI request", and priority indicator field set to "1" and the PUSCH overlaps with a PUCCH transmission on a serving cell that includes positive SR information, the UE does not transmit the SR information.

Method 3

When a high priority UL transmission overlaps with a low priority UL transmission in a slot and if the UE is configured with the feature and/or reported the capability that UE would drop low priority transmission, the UE is expected to cancel the low-priority UL transmission starting from a specified cancelation time after the end of PDCCH scheduling the high priority transmission, where the cancelation time is function of UE processing time capability and other UE capability parameters.

In one embodiment, if a UE reports the capability of intra-UE prioritization and/or is configured with the feature of intra-UE prioritization, and if a PUSCH corresponding to a configured grant and a PUSCH scheduled by a PDCCH on a serving cell are partially or fully overlapping in time:

If the PUSCH corresponding to the configured grant has priority in configuredGrantConfig set to 1 (e.g., high priority), and the PUSCH scheduled by the PDCCH is indicated as low priority by having the priority indicator field in the scheduling DCI set to 0 or by not having the priority indicator field present in the scheduling DCI, the UE is expected to transmit the PUSCH corresponding to the configured grant, and cancel the PUSCH transmission scheduled by the PDCCH at latest starting at the first symbol of the PUSCH corresponding to the configured grant.

Otherwise, the UE cancels the PUSCH transmission corresponding to the configured grant at latest starting M symbols after the end of the last symbol of the PDCCH carrying the DCI scheduling the PUSCH, and transmit the PUSCH scheduled by the PDCCH, where $M=T_{proc,2}+d_1$, where $T_{proc,2}$ is given by clause 6.4 of 3GPP TS 38.214 for the corresponding PUSCH timing capability assuming $d_{2,1}=0$ and $d_1$ is determined by the reported UE capability, In this case, the UE is not expected to be scheduled for the PUSCH by the PDCCH where the PUSCH starts earlier than max (M, N) symbols after the end of the last symbol of the PDCCH, where $N=T_{proc,2}+d_2$, where $T_{proc,2}$ is the PUSCH preparation time of the PUSCH scheduled by the PDCCH using the associated PUSCH timing capability according to clause 6.4 (TS 38.214) and $d_2$ is determined by the reported UE capability.

In case of PUSCH repetitions, the overlapping handling is performed for each PUSCH repetition separately.

The UE is not expected to be scheduled for another PUSCH by a PDCCH where the other PUSCH starts no earlier than the end of the prioritized transmitted PUSCH and before the end of the time domain allocation of the cancelled PUSCH.

In another embodiment, if a UE reports the capability for intra-UE prioritization and/or is configured with the feature of intra-UE prioritization, and if a first PUSCH and a second PUSCH scheduled by corresponding PDCCHs on a serving cell are partially or fully overlapping in time, If the first PUSCH is associated with low priority and second PUSCH is associated with high priority, the UE cancels the first PUSCH transmission at latest starting M symbols after the end of the last symbol of the PDCCH carrying the DCI scheduling the second PUSCH, and transmits the second PUSCH scheduled by the PDCCH, where $M=T_{proc,2}+d_1$, where $T_{proc,2}$ is given by clause 6.4 (see TS 38.214) for the corresponding PUSCH timing capability assuming $d_{2,1}=0$ and $d_1$ is determined by the reported UE capability, In this case, the UE is not expected to be scheduled for the second PUSCH where the second PUSCH starts earlier than max (N, N) symbols after the end of the last symbol of the PDCCH scheduling second PUSCH, where $N=T_{proc,2}+d_2$, where $T_{proc,2}$ is the PUSCH preparation time of the second PUSCH scheduled by the PDCCH using the associated PUSCH timing capability according to clause 6.4 (TS 38.214) and $d_2$ is determined by the reported UE capability.

In case of PUSCH repetitions, the overlapping handling is performed for each PUSCH repetition separately.

In an example of the above embodiment, the opposite of the above may also occur using a similar procedure.

In another embodiment, if a UE reports the capability of intra-UE prioritization and/or is configured with the feature of intra-UE prioritization, and if a PUSCH is scheduled by a PDCCH and a HARQ-ACK is scheduled by a PDCCH on a serving cell are partially or fully overlapping in time, If the HARQ-ACK to be carried in a PUCCH is associated with high priority and the PUSCH is of low priority, the UE cancels the PUSCH transmission at latest starting M symbols after the end of the last symbol of the PDCCH carrying the DCI scheduling the HARQ-ACK, and transmits the PUCCH carrying the HARQ-ACK, where $M=T_{proc,2}+d_1$, where $T_{proc,2}$ is given by clause 6.4 (see TS 38.214) for the corresponding PUSCH timing capability assuming $d_{2,1}=0$ and $d_1$ is determined by the reported UE capability, In this case, the UE is not expected to be scheduled for the PUCCH with HARQ-ACK feedback where the PUCCH starts earlier than max (M, N) symbols after the end of the last symbol of the PDCCH scheduling PUCCH with HARQ-ACK feedback, where $N=T_{proc,1}+d_2$, where $T_{proc,1}$ is the PDSCH processing time scheduled by the PDCCH (for which HARQ-ACK is generated) using the associated PDSCH timing capability according to clause 6.4 (TS 38.214) and $d_2$ is determined by the reported UE capability.

In case of PUSCH or PUCCH repetitions, the overlapping handling is performed for each PUSCH or PUCCH repetition separately.

In an example of the above embodiment, the opposite of the above may also occur, e.g., the HARQ-ACK is of low priority and the PUSCH is of high priority, and UE would cancel HARQ-ACK following a similar procedure, that is, If the HARQ-ACK to be carried in a PUCCH is associated with low priority and the PUSCH is of high priority, the UE cancels the PUCCH transmission at latest starting M symbols after the end of the last symbol of the PDCCH carrying the DCI scheduling the PUSCH, and transmits the PUSCH, where $M=T_{proc,2}+d_1$, where $T_{proc,2}$ is given by clause 6.4 (see TS 38.214) for the corresponding PUSCH timing capability assuming $d_{2,1}=0$ and $d_1$ is determined by the reported UE capability, In this case, the UE is not expected to be scheduled for the PUSCH where the PUSCH starts earlier than max (N, N) symbols after the end of the last symbol of the PDCCH scheduling the PUSCH, where $N=T_{proc,2}+d_2$, where $T_{proc,1}$ is the PDSCH processing time scheduled by the PDCCH (for which HARQ-ACK is generated) using the associated PDSCH timing capability according to clause 6.4 (TS 38.214) and $d_2$ is determined by the reported UE capability. $T_{proc,2}$ is given by the PUSCH timing capability as mentioned above.

In case of PUSCH or PUCCH repetitions, the overlapping handling is performed for each PUSCH or PUCCH repetition separately.

Method 4

This method focuses on collision handling when the PUSCH and PUCCH (e.g., carrying the HARQ-ACK) are dynamically triggered by UL and DL scheduling DCI formats, where the PUSCH and PUCCH are assigned overlapping resources in a slot. The UE is also configured to monitor for a UL CI, which indicates whether to cancel any previously scheduled UL transmission if the previously scheduled UL transmission overlaps with the indicated impacted region.

Figure 3:
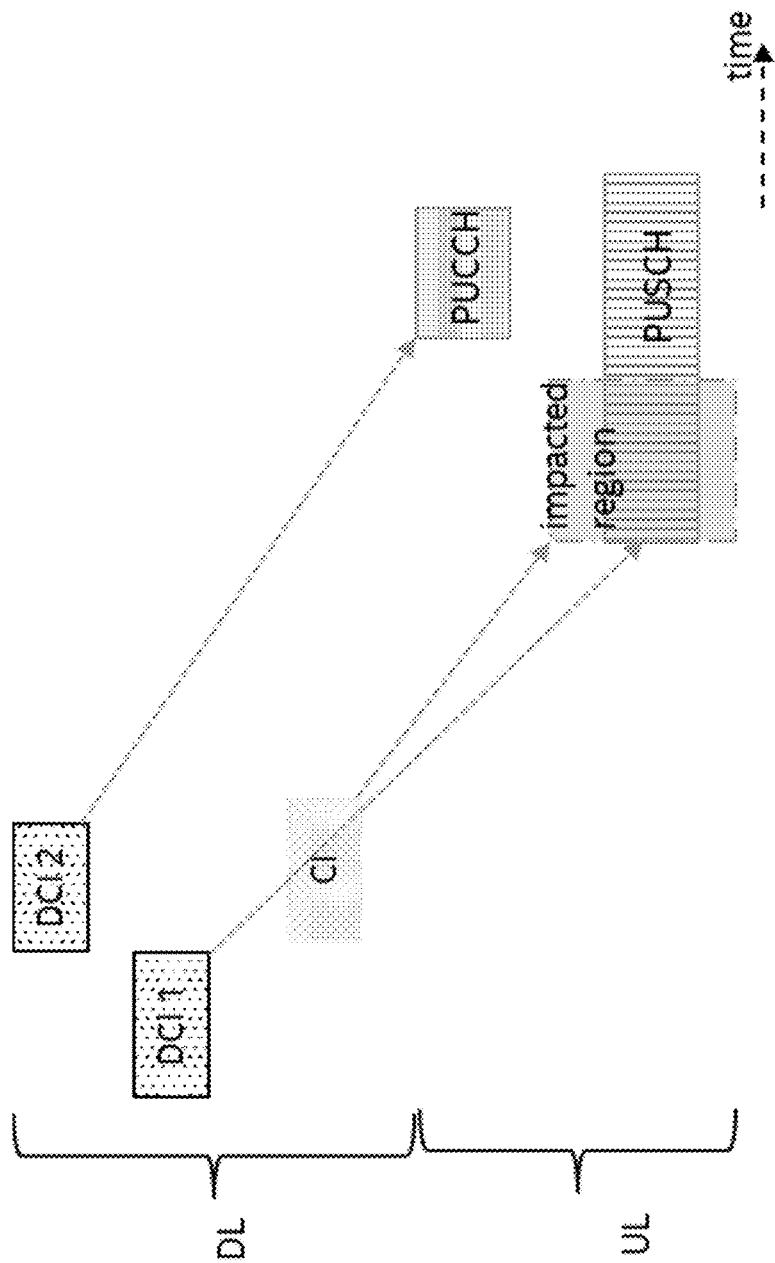
FIG. 3 illustrates collision handling in accordance with some embodiments.

Consider a scenario in which a first DCI schedules a first resource for a PUSCH and a second DCI schedules a second resource for a PUCCH, such as for transmitting a HARQ-ACK, where first and second resources overlap in time, for example, in a slot with or without overlapped symbols. In a third DCI, the UE receives a UL CI and the PDCCH carrying the UL CI may overlap with one or both of the first or second DCI. By overlapping DCIs, it is implied that managed objection (Mos) where the DCIs are received overlap in time, at least including the scenarios in which the PDCCHs carrying the UL CI (DCI format 2_4) and carrying the first and/or second DCI format, respectively, overlap such that the PDCCH carrying DCI format 2_4:

starts at or after the first symbol of the CORESET to which the latter PDCCH (carrying the first and/or second DCI format triggering the PUSCH and/or PUCCH respectively) is mapped, and ends at or before the last symbol of the CORESET to which the latter PDCCH (carrying the first and/or second DCI format triggering the PUSCH and/or PUCCH respectively) is mapped. FIG. 3 provides an example of the case.

FIG. 3 illustrates collision handling in accordance with some embodiments. In particular, FIG. 3 illustrates collision handling when a cancelation indication (CI) indicates a PUSCH to be cancelled and the DCI of the CI and the DCI of the PUCCH overlaps. The PUCCH may or may not be transmitted.

In a first variant of the above scenario, the second DCI is received after the first DCI, e.g., the last symbol of the PDCCH carrying the second DCI is after the last symbol of the PDCCH carrying first DCI, the PDCCH carrying the third DCI (DCI format 2_4) overlaps with the PDCCH carrying the second DCI, and the UL CI indicates an impacted region which includes resources of the PUSCH in part and does not include resources of the PUCCH.

In one embodiment, the UE is expected to cancel the PUSCH without multiplexing the HARQ-ACK onto the PUSCH and transmits the PUCCH carrying the HARQ-ACK separately. This assumes the UE may have sufficient time to process the overlapping DCIs and identify multiplexing HARQ-ACK onto the PUSCH may not be useful since the PUSCH would be canceled anyways. The UE may report the capability to process such overlapping DCIs and prepare for transmission of the PUCCH.

In another embodiment, the UE is expected to drop both the PUCCH and PUSCH upon receiving the CI starting from the first symbol of the PUSCH that overlaps with the impacted region. In this example, depending on the order of processing the second and third DCI (e.g., this can be up to UE implementation) and/or due to constraints reported in a UE capability, the UE may not be able to transmit the PUCCH. The UE may have decoded the second DCI first, identifying that the HARQ-ACK could be multiplexed onto the PUSCH and later upon detecting the UL CI, identifies that the PUSCH, where the HARQ-ACK is about to be multiplexed, is to be dropped. In one extension of the embodiment, if the PDCCHs of the second DCI and third DCI ends at the same symbol, the UE is expected to cancel the PUCCH transmission as well along with PUSCH transmission. In another example, if the last symbol of the PDCCH carrying the second DCI is before the last symbol of the PDCCH carrying the third DCI, the UE drops both the PUCCH and PUSCH transmission from the first symbol of the PUSCH that overlaps with the impacted region. In yet another example, if the last symbol of the PDCCH carrying the second DCI is after the last symbol of the PDCCH carrying the third DCI, the UE only cancels the PUSCH from the first symbol of the PUSCH that overlaps with the impacted region and transmits the HARQ-ACK in the PUCCH.

In a second variant of the above scenario, the second DCI is received before the first DCI, e.g., the last symbol of the PDCCH carrying the second DCI is before the last symbol of the PDCCH carrying the first DCI, the PDCCH carrying the third DCI overlaps with the PDCCH carrying the first DCI, and the UL CI indicates an impacted region which includes the resource of PUCCH in part and does not include the resource of PUSCH. In embodiments of this disclosure, the examples of the embodiment described for the first variant of the above scenario apply by exchanging the second DCI with the accompanying PUCCH with the first DCI with the accompanying PUSCH.

In another embodiment, the UE does not expect to detect a DCI format scheduling a PUCCH resource for the HARQ-ACK and a DCI format 2_4, that indicates the cancellation of a PUSCH which overlaps with the PUCCH in a slot or sub-slot, in the same monitoring occasion of a search space set or overlapping monitoring occasions of different search space sets, at least including the scenarios in which the two PDCCHs overlap such that the PDCCH carrying DCI format 2_4: starts at or after the first symbol of the CORESET to which the PDCCH carrying the DCI format triggering the PUCCH is mapped, and ends at or before the last symbol of the CORESET to which the PDCCH carrying the DCI format triggering the PUCCH is mapped.

In another embodiment, instead of an UL CI, a UE may receive a third DCI carrying a UL grant for a high priority PUSCH or a DL grant indicating a PUCCH for carrying a high priority HARQ-ACK where the PDCCH carrying the third DCI may overlap with at least one of the PDCCHs carrying the first and second DCIs, with the conditions for overlapping DCI formats defined as above for the UL CI (DCI format 2_4).

A high priority PUSCH or PUCCH may overlap with one or both of a low priority PUSCH or PUCCH. A first and second DCI schedule a low priority PUSCH and low priority HARQ-ACK in a PUCCH respectively, which overlap in an UL slot or sub-slot.

Figure 4:
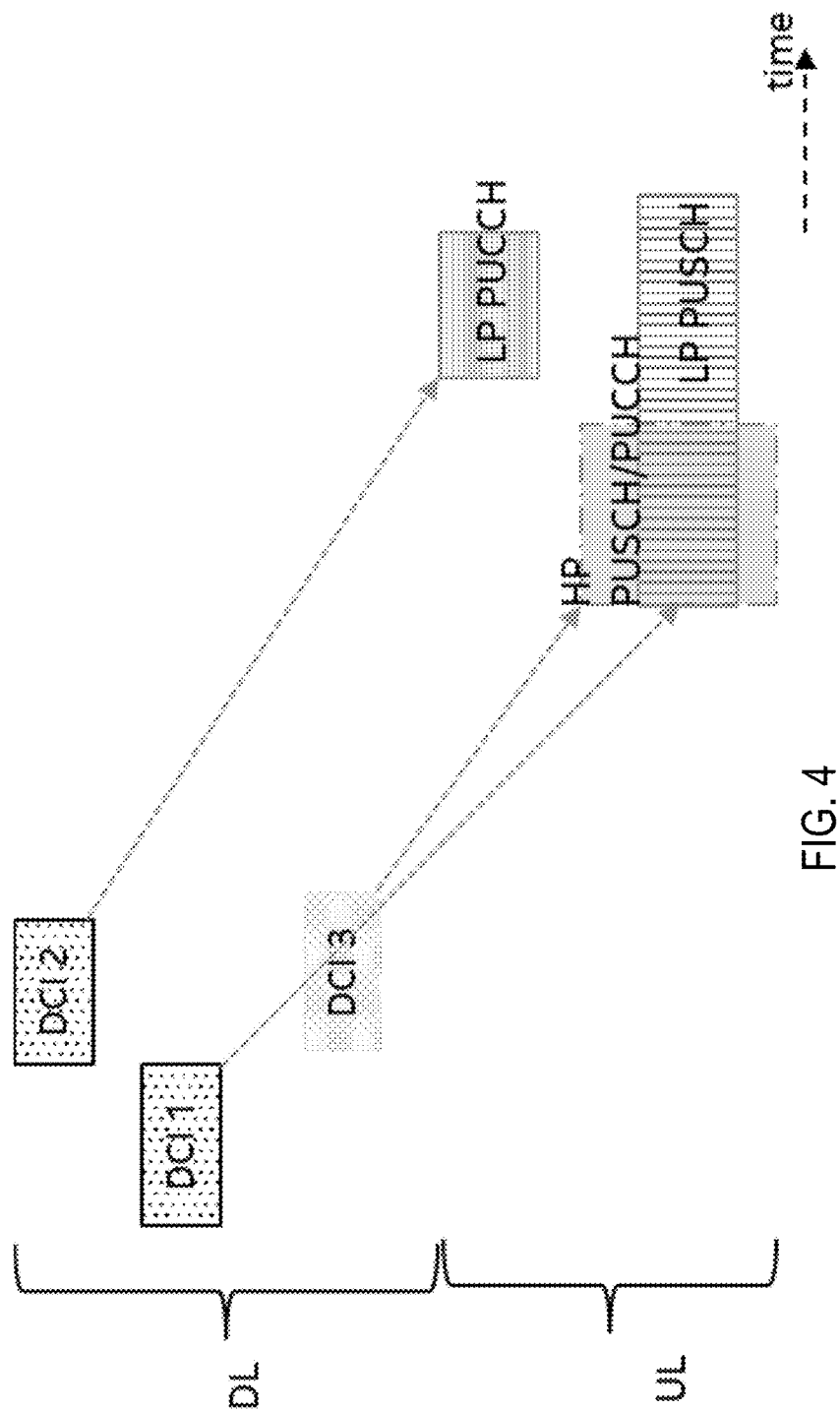
FIG. 4 illustrates a resource overlap in accordance with some embodiments.

In an example of the embodiment, if the PDCCHs carrying both the first and second DCIs end before the PDCCH of third DCI, such as shown in FIG. 4, the UE is expected to multiplex the low priority HARQ-ACK in the low priority PUSCH (e.g., handles same priority first) and upon detecting the third DCI format, drops both the low priority PUSCH and low priority HARQ-ACK.

In another variant of this example, PDCCH carrying the third DCI format ends after PDCCH of first DCI but before end of PDCCH of second DCI, and in this case, the UE is expected to drop the low priority PUSCH by transmitting high priority PUSCH or PUCCH (triggered by the third DCI format), and also expected to transmit the low priority PUCCH, where the low priority PUSCH overlaps with the high priority PUSCH or PUCCH, while the low priority PUCCH does not have any overlap with either of the other channels. In this example, the UE processes DCI formats indicating different priority transmissions first, e.g., the first and third DCI formats, and later processes the second DCI format.

In a further example, in order to handle collision involving more than one low priority transmission (e.g., if low priority PUSCH overlaps with low priority PUCCH (e.g., carrying HARQ-ACK) in a slot) and at least one high priority transmission, which may overlap with at least one of the low priority transmissions, if the PDCCH carrying the DCI of a high priority transmission overlaps with at least one of the PDCCH carrying the DCI of one of the low priority transmissions, the UE is expected to process the DCI formats of the low priority transmissions, e.g., may prepare for multiplexing of the HARQ-ACK onto the PUSCH, and then process the DCI format indicating a high priority transmission and drop both the PUSCH and HARQ-ACK feedback.

FIG. 4 illustrates a resource overlap in accordance with some embodiments. In particular, FIG. 4 DCI 3 indicates a resource for a high priority PUSCH or high priority PUCCH overlaps DCI 2. In this case, both the Low Priority (LP) PUSCH and LP PUCCH are dropped and only the HP PUSCH/PUCCH is transmitted.

Method 5

This method discusses applicability of the UL CI to a transmission. In particular, this method discusses whether a transmission scheduled before, during, or after a UL CI transmission can be canceled by a UL CI received via a DCI format 2_4 or not. Moreover, if a first UL transmission is cancelled by a UL CI, whether another UL transmission can be scheduled in the cancelled symbols of the first transmission, after the cancelled symbols of the first transmission, or in the resource indicated by the UL CI. The resource indicated by the UL CI implies where an applicable transmission is to be canceled if the transmission overlaps with the resource.

In the context of the embodiment, the first and second UL transmissions are identified where the second UL transmission starts after the first symbol of the first UL transmission. The UL CI may cancel the first transmission but cannot cancel the second UL transmission. If the first transmission is canceled, the first transmission may or may not resume after canceled symbols. If the first UL transmission is dynamically scheduled, the last symbol of the PDCCH of the DCI triggering the first UL transmission is before the first symbol of the PDCCH carrying the UL CI. The second UL transmission is dynamically scheduled by a DCI where the PDCCH carrying the DCI starts at the same symbol or after the first symbol of the PDCCH carrying the UL CI.

If the first UL transmission is a dynamically granted (DG) PUSCH, A-SRS, PUCCH carrying at least HARQ-ACK or Semi-Persistent Scheduling (SPS)-PUSCH, the first DCI corresponds to the UL grant, DL or UL grant, DL grant, or UL grant activating SPS-PUSCH, respectively. The UL grant can be provided by DCI formats 0_0, 0_1, or 0_2, the DL grant can be provided in DCI formats 1_0, 1_1, or 1_2. If the first UL transmission is semi-statically configured, e.g., not one of the above triggered by grant or DCI, it can be one of the CG-PUSCH, PUCCH carrying a CSI and/or SR, P/SP-SRS etc.

The second UL transmission can be a PUCCH carrying at least HARQ-ACK triggered by a DL grant or an A-SRS triggered by UL or DL grant that is provided by the second DCI. The minimum time interval between the last symbol of the PDCCH carrying the second DCI and the first symbol of the second UL transmission can be based on the UE capability. For a PUCCH carrying a HARQ-ACK, the minimum time is at least $T_{proc,1}$, whereas for an A-SRS it is N2 (in symbols) if the SRS in a resource set with usage set to 'codebook' or 'antennaSwitching' or N2+14, otherwise. TS 38.214 contains definitions of $T_{proc,1}$ and N2. For an A-SRS, the minimal time interval in units of OFDM symbols is counted based on the minimum subcarrier spacing between the PDCCH and the aperiodic SRS (A-SRS).

First and second UL transmissions may also comprise one or more repetitions.

Case 1

In Case 1, a first UL transmission is cancelled by a UL CI, e.g., a resource of a first UL transmission overlaps with the resource indicated by a UL CI. In one embodiment, a second UL transmission, that may be one of: a PUCCH carrying a HARQ-ACK triggered by a DL grant or a PUCCH carrying a HARQ-ACK in response to one or more SPS releases or SPS PDSCH reception(s), or an A-SRS triggered by a UL or DL grant or a group common DCI format that is provided by a second DCI, or a Physical Random Access Channel (PRACH), or a PUCCH carrying a SR or Periodic CSI report (P-CSI) can be transmitted in the symbols that may overlap with one or more of the symbols of the first UL transmission that did not overlap with the resource indicated as canceled by the UL CI, if the symbols of the second UL transmission do not overlap with the resource indicated by the UL CI, and, the first UL transmission may not resume after cancelled symbols and may be one of: a dynamically granted PUSCH, or CG PUSCH, or an A-SRS, or a Periodic SRS, or a PUCCH carrying at least a HARQ-ACK that is triggered by a DL grant, or a PUCCH carrying a HARQ-ACK in response to one or more an SPS release or SPS PDSCH reception(s) or a PUCCH carrying SR or periodic CSI reports.

Figure 5:
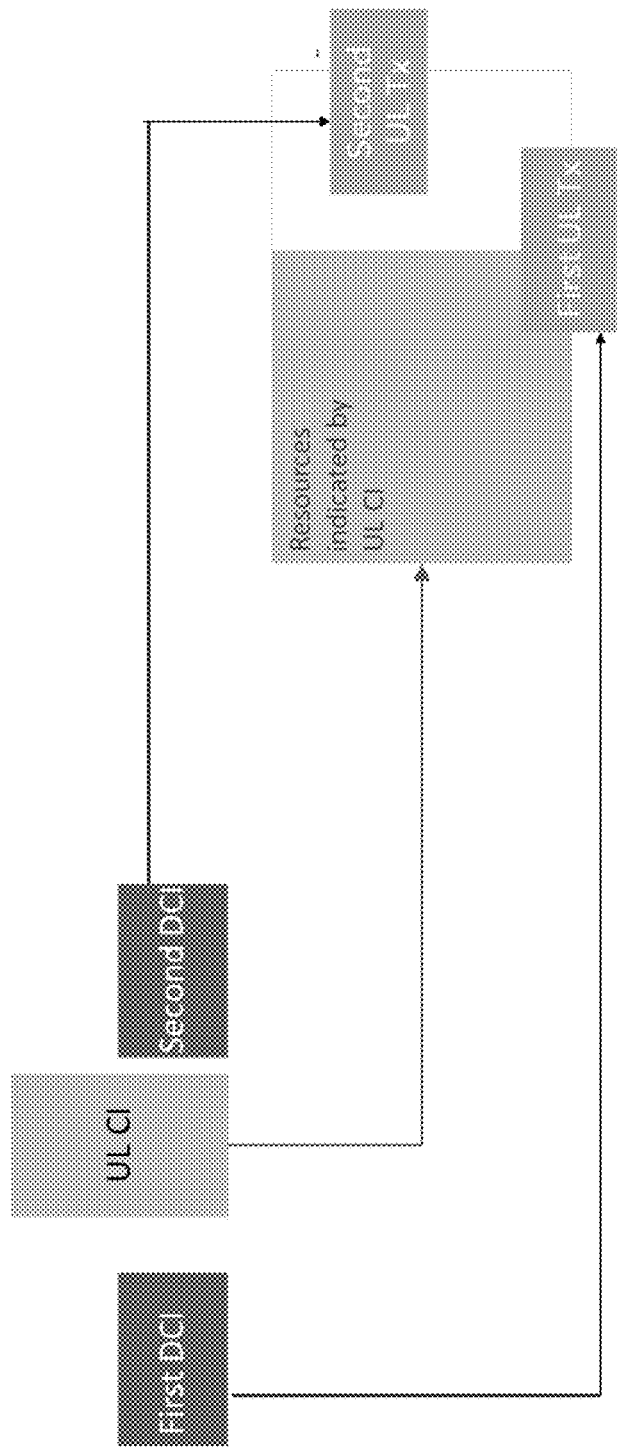
FIG. 5 illustrates dynamic scheduling of a first transmission in accordance with some embodiments.

FIG. 5 shows an example of Case 1 where the first UL transmission (Tx) is dynamically scheduled by the first DCI.

In another embodiment for Case 1, a second UL transmission, that may be one of: a DG or configured grant PUSCH, a PUCCH carrying a HARQ-ACK triggered by a DL grant or a PUCCH carrying a HARQ-ACK in response to one or more an SPS release or SPS PDSCH reception(s), or an A-SRS triggered by a UL or DL grant or a group common DCI format that is provided by a second DCI, or a CG PUSCH, or a PRACH, or a PUCCH carrying a SR or a P-CSI or a PUSCH carrying a semi-persistent CSI report (SP-CSI), can be transmitted in the symbols that may overlap with one or more of the symbols of a first UL transmission that did not overlap with the resource indicated as canceled by the UL CI, if the symbols of the second UL transmission do not overlap with the resource indicated by the UL CI, and, the first UL transmission may not resume after cancelled symbols and may be one of an A-SRS, or a Periodic SRS, or a PUCCH carrying at least a HARQ-ACK that is triggered by a DL grant, or a PUCCH carrying a HARQ-ACK in response to one or more SPS releases or SPS PDSCH reception(s) or a PUCCH carrying SR or periodic CSI reports.

FIG. 5 illustrates dynamic scheduling of a first transmission in accordance with some embodiments In this embodiment, part of the first UL transmission overlaps with a resource indicated by a UL CI and the second UL transmission can be made in one or more symbols of the first UL transmission that did not overlap with resource indicated by the UL CI.

Case 2

In Case 2, a first UL transmission is cancelled by a UL CI, e.g., a resource of a first UL transmission overlaps with the resource indicated by a UL CI. In one embodiment, a second UL transmission, that may be one of: a PUCCH carrying a HARQ-ACK triggered by a DL grant or a PUCCH carrying a HARQ-ACK in response to one or more SPS releases or SPS PDSCH reception(s), or an A-SRS triggered by a UL or DL grant or by a group common DCI format that is provided by a second DCI, or a PRACH, or a PUCCH carrying a SR or P-CSI, can be transmitted in the symbols that do not overlap with one or more of the canceled symbols of the first UL transmission and symbols of the second UL transmission may not overlap with the resource indicated by the UL CI, and, the first UL transmission may be one of: a dynamically granted PUSCH, or a CG PUSCH, or an A-SRS, a PUCCH carrying at least a HARQ-ACK that is triggered by a DL grant, or a PUCCH carrying a HARQ-ACK in response to one or more SPS releases or SPS PDSCH reception(s) or a PUCCH carrying SR or periodic CSI reports.

In another embodiment for Case 2, a second UL transmission, that may be one of: a PUCCH carrying a HARQ-ACK triggered by a DL grant or a PUCCH carrying a HARQ-ACK in response to one or more SPS release reception(s), or an A-SRS triggered by a UL or DL grant or by a group common DCI format which is provided by a second DCI, or a PRACH, or a PUCCH carrying a SR or P-CSI, can be transmitted in the symbols that do not overlap with one or more of the canceled symbols of the first UL transmission and symbols of the second UL transmission may overlap with the resource indicated by the UL CI, and, the first UL transmission may be one of: a dynamically granted PUSCH, or a CG PUSCH, or an A-SRS, a PUCCH carrying at least a HARQ-ACK that is triggered by a DL grant, or a PUCCH carrying a HARQ-ACK in response to one or more SPS releases or SPS PDSCH reception(s) or a PUCCH carrying SR or periodic CSI reports.

Figure 6:
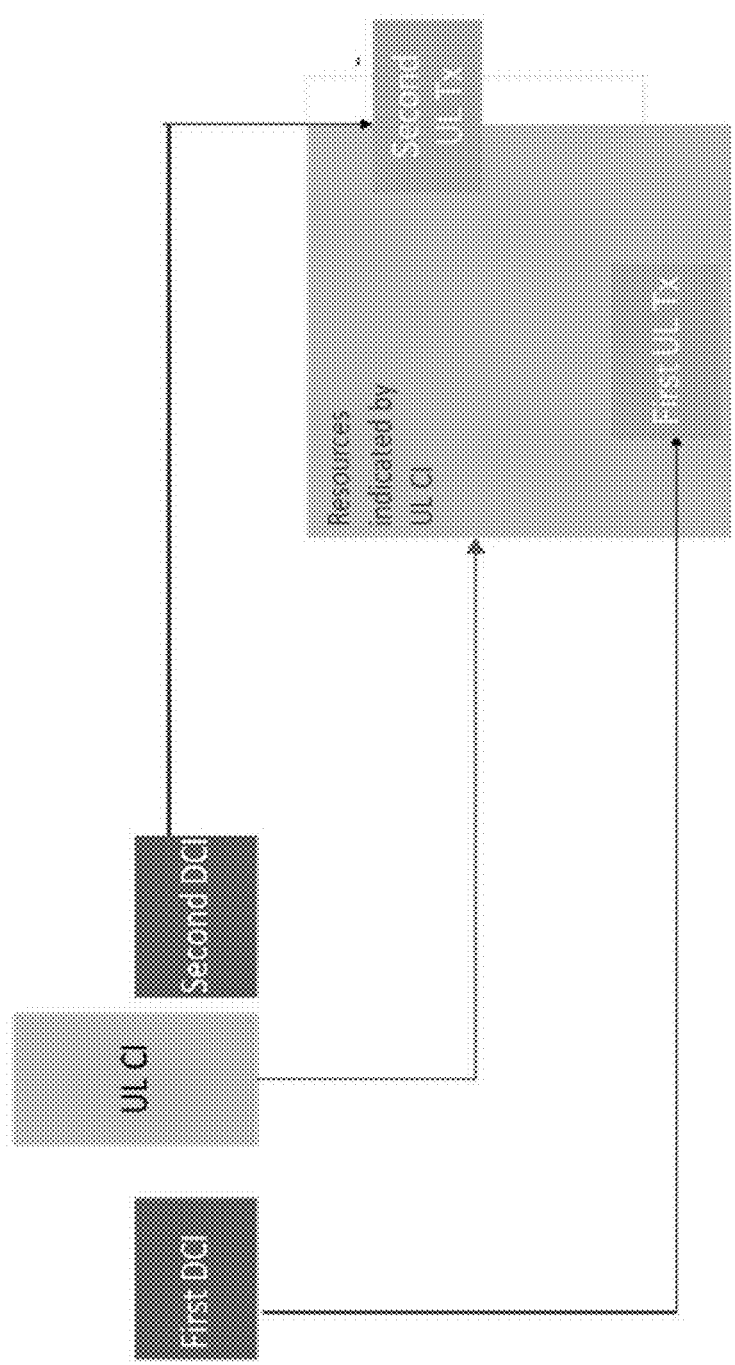
FIG. 6 illustrates dynamic scheduling of a first transmission in accordance with some embodiments.

FIG. 6 illustrates dynamic scheduling of a first transmission in accordance with some embodiments. FIG. 6 shows an example of Case 2 where the first UL transmission is dynamically scheduled by the first DCI. In one example of the embodiment, a minimum time interval between the last symbol of the PDCCH carrying the second DCI and the first symbol of the second UL transmission is extended if the last symbol of the PDCCH carrying the second DCI is before the first symbol of the first UL transmission. In an extension of the example, if the second transmission is a PUCCH carrying at least a HARQ-ACK, the minimum time is extended to at least $T_{proc,1}$+delta, whereas for an A-SRS it is N2+delta if the SRS in a resource set with usage set to 'codebook' or 'antennaSwitching' or N2+14+delta, otherwise. Here, delta may depend on the UE capability and SCS. Alternatively, delta can be configured such as from delta=0, 1, 2, 3, 4 etc. based on the SCS of an active UL BWP and/or DL BWP and/or reference SCS. In another example, delta can be based on a minimum cancelation time between the last symbol of the PDCCH of the UL CI and the first symbol of the first UL transmission. The second Transmission is scheduled after the cancelled symbols of first UL transmission.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a user equipment (UE) configured to operate in a new radio (NR) network, the apparatus comprising:
processing circuitry configured to:
decode at least one physical downlink control channel (PDCCH) having a downlink control information (DCI) format that schedules a first uplink (UL) transmission;
determine that the first UL transmission overlaps with a second UL transmission, the first UL transmission having a larger priority index than the second UL transmission;
encode the first UL transmission at least a physical uplink shared channel (PUSCH) preparation time after a last symbol of the PDCCH, the PUSCH preparation time dependent on UE processing capability; and
encode UE capability parameters in a UE capability information message, the UE capability parameters including whether the UE supports prioritization of overlapping UL transmissions of different priorities, and a number of symbols beyond the PUSCH preparation time for cancelation of a low priority UL transmission; and
a memory configured to store the PUSCH preparation time.

2. The apparatus of claim 1, wherein:
the first UL transmission is a first physical uplink control channel (PUCCH) transmission;
the second UL transmission is a repetition of a PUSCH transmission or a second PUCCH transmission; and
the processing circuitry is configured to cancel the repetition of the PUSCH transmission or the second PUCCH transmission before a first symbol that would overlap with the first PUCCH transmission.

3. The apparatus of claim 1, wherein:
the first UL transmission is a PUSCH transmission;
the second UL transmission is a repetition of a physical uplink control channel (PUCCH) transmission; and
the processing circuitry is configured to cancel the repetition of the PUCCH transmission before a first symbol that would overlap with the PUSCH transmission.

4. The apparatus of claim 1, wherein the PUSCH preparation time is dependent on subcarrier spacing of the at least one PDCCH.

5. The apparatus of claim 1, wherein the PUSCH preparation time is dependent on PUSCH timing capability of the UE and a value reported by the UE.

6. The apparatus of claim 1, wherein the second UL transmission is a configured grant PUSCH transmission.

7. The apparatus of claim 1, wherein at least one of the UL transmission or the second UL transmission contains hybrid automatic repeat request-acknowledgement (HARQ-ACK) information.

8. The apparatus of claim 1, wherein:
the second UL transmission is a repetition of another UL transmission, and
the processing circuitry configures the UE to cancel the second UL transmission on a per-repetition basis.

9. A non-transitory computer-readable storage medium that stores instructions for execution by one or more processors of a user equipment (UE) configured to operate in a new radio (NR) network, the one or more processors configured to, when the instructions are executed:
decode at least one physical downlink control channel (PDCCH) having a downlink control information (DCI) format that schedules a first uplink (UL) transmission;
determine that the first UL transmission overlaps with a second UL transmission, the first UL transmission having a larger priority index than the second UL transmission;
encode the first UL transmission at least a physical uplink shared channel (PUSCH) preparation time after a last symbol of the PDCCH, the PUSCH preparation time dependent on UE processing capability; and
encode UE capability parameters in a UE capability information message, the UE capability parameters including whether the UE supports prioritization of overlapping UL transmissions of different priorities, and a number of symbols beyond the PUSCH preparation time for cancelation of a low priority UL transmission.

10. The non-transitory computer-readable storage medium of claim 9, wherein:
the first UL transmission is a first physical uplink control channel (PUCCH) transmission;

the second UL transmission is a repetition of a PUSCH transmission or a second PUCCH transmission; and the one or more processors are configured to cancel the repetition of the PUSCH transmission or the second PUCCH transmission before a first symbol that would overlap with the first PUCCH transmission.

11. The non-transitory computer-readable storage medium of claim 9, wherein:

the first UL transmission is a PUSCH transmission;

the second UL transmission is a repetition of a physical uplink control channel (PUCCH) transmission; and the one or more processors configure the UE to, when the instructions are executed, cancel the repetition of the PUCCH transmission before a first symbol that would overlap with the PUSCH transmission.

12. The non-transitory computer-readable storage medium of claim 9, wherein the PUSCH preparation time is dependent on subcarrier spacing of the at least one PDCCH, PUSCH timing capability of the UE and a value reported by the UE.

13. The non-transitory computer-readable storage medium of claim 9, wherein at least one of:

the second UL transmission is a configured grant PUSCH transmission, or at least one of the UL transmission or the second UL transmission contains hybrid automatic repeat request-acknowledgement (HARQ-ACK) information.

14. The non-transitory computer-readable storage medium of claim 9, wherein:

the second UL transmission is a repetition of another UL transmission, and the one or more processors configure the UE to, when the instructions are executed, cancel the second UL transmission on a per-repetition basis.

15. An apparatus of a 5$^{th}$ generation NodeB (gNB), the apparatus comprising:

processing circuitry configured to:

decode, from a user equipment (UE), capability parameters in a UE capability information message, the UE capability parameters including whether the UE supports prioritization of overlapping UL transmissions of different priorities;

encode, to the UE, at least one physical downlink control channel (PDCCH) having a downlink control information (DCI) format that schedules a first uplink (UL) transmission that overlaps with a second UL transmission, the first UL transmission having a larger priority index than the second UL transmission;

decode, from the UE, the first UL transmission at least a physical uplink shared channel (PUSCH) preparation time after a last symbol of the PDCCH, the PUSCH preparation time dependent on UE processing capability; and decode UE capability parameters in a UE capability information message, the UE capability parameters including whether the UE supports prioritization of overlapping UL transmissions of different priorities, and a number of symbols beyond the PUSCH preparation time for cancelation of a low priority UL transmission; and a memory configured to store the PUSCH preparation time.

16. The apparatus of claim 15, wherein one of:

the first UL transmission is a first physical uplink control channel (PUCCH) transmission, the second UL transmission is a repetition of a PUSCH transmission or a second PUCCH transmission, and the repetition of the PUSCH transmission or the second PUCCH transmission is canceled before a first symbol that would overlap with the first PUCCH transmission, or the first UL transmission is a PUSCH transmission, the second UL transmission is another repetition of a third PUCCH transmission, and the other repetition of the PUCCH transmission is canceled before a first symbol that would overlap with the PUSCH transmission.

* * * * *